(12) United States Patent
Littleton et al.

(10) Patent No.: US 12,374,773 B2
(45) Date of Patent: Jul. 29, 2025

(54) PAN/TILT ASSEMBLY FOR ANTENNA APPARATUS

(71) Applicant: Space Exploration Technologies Corp., Hawthorne, CA (US)

(72) Inventors: Erik N. Littleton, Los Angeles, CA (US); Duncan Edwin Adams, Redmond, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 18/435,899

(22) Filed: Feb. 7, 2024

(65) Prior Publication Data

US 2024/0213652 A1 Jun. 27, 2024

Related U.S. Application Data

(62) Division of application No. 17/065,743, filed on Oct. 8, 2020, now Pat. No. 11,901,606.

(60) Provisional application No. 62/959,133, filed on Jan. 9, 2020.

(51) Int. Cl.
| | |
|---|---|
| *H01Q 1/12* | (2006.01) |
| *F16M 11/12* | (2006.01) |
| *F16M 11/18* | (2006.01) |
| *H01Q 3/08* | (2006.01) |

(52) U.S. Cl.
CPC .......... *H01Q 1/125* (2013.01); *F16M 11/126* (2013.01); *F16M 11/18* (2013.01); *H01Q 3/08* (2013.01)

(58) Field of Classification Search
CPC ........ H01Q 1/125; H01Q 3/08; F16M 11/126; F16M 11/18
See application file for complete search history.

(56) References Cited

U.S. PATENT DOCUMENTS

| | | | | |
|---|---|---|---|---|
| 2,600,513 A | * | 6/1952 | Meilstrup | H01Q 3/08 343/765 |
| 3,386,694 A | * | 6/1968 | Boyle | H01Q 3/08 475/9 |
| 3,530,477 A | * | 9/1970 | Jarrett | H01Q 3/08 343/765 |
| 4,209,789 A | * | 6/1980 | Snedkerud | H01Q 3/02 343/890 |
| 4,396,919 A | * | 8/1983 | Speicher | H01Q 3/08 343/765 |
| 4,491,847 A | * | 1/1985 | Estang | H01Q 3/08 343/765 |

(Continued)

OTHER PUBLICATIONS

Product Portfolio of Magna Auteca, Year 2018, 33 pages, Germany.

*Primary Examiner* — Nkeisha Smith
(74) *Attorney, Agent, or Firm* — Polsinelli PC

(57) ABSTRACT

In one embodiment of the present disclosure, a pan/tilt assembly for an antenna apparatus having a housing enclosing antenna components and a leg extending from the housing includes a first actuator for rotating a first gear, a second actuator for rotating a second gear, a third gear coupled to the leg and engaged by the first and second gears, and a tee having a first portion substantially transverse to a second portion, wherein the first portion has a first end rotatably received within the first gear and a second end rotatably received within the second gear, and wherein the second portion is rotatably received within the third gear.

10 Claims, 8 Drawing Sheets

(56) References Cited

U.S. PATENT DOCUMENTS

| | | | | |
|---|---|---|---|---|
| 4,953,422 | A | * | 9/1990 | Chapman ................. H01Q 3/08 248/661 |
| 5,485,169 | A | * | 1/1996 | Kitabatake ............. H01Q 1/005 343/765 |
| 5,517,204 | A | | 5/1996 | Murakoshi et al. |
| 5,633,647 | A | * | 5/1997 | Tines ....................... H01Q 3/08 343/765 |
| 5,952,979 | A | * | 9/1999 | Choi ........................ H01Q 3/08 343/882 |
| 6,313,805 | B1 | | 11/2001 | Nishiyama |
| 9,083,072 | B2 | | 7/2015 | Conrad et al. |
| 9,425,507 | B1 | | 8/2016 | Lee |
| 9,531,851 | B2 | | 12/2016 | Häntsch |
| 10,601,103 | B2 | | 3/2020 | Hataya et al. |
| 10,957,976 | B2 | * | 3/2021 | Lee .......................... H01Q 1/27 |
| 2015/0059500 | A1 | | 3/2015 | Conrad et al. |
| 2017/0025752 | A1 | * | 1/2017 | Zimmerman ............ H01Q 3/08 |
| 2023/0145053 | A1 | * | 5/2023 | Kilbury ................ H01Q 21/065 343/872 |

* cited by examiner

PAN/TILT ASSEMBLY FOR ANTENNA APPARATUS

CROSS-REFERENCE TO RELATED APPLICATION

This application is a division of U.S. patent application Ser. No. 17/065,743, filed Oct. 8, 2020, entitled "PAN/TILT ASSEMBLY FOR ANTENNA APPARATUS", which claims the benefit of U.S. Provisional Application No. 62/959,133, filed Jan. 9, 2020, entitled "PAN/TILT ASSEMBLY FOR ANTENNA APPARATUS", the disclosures of which are hereby expressly incorporated by reference herein in their entirety.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment of the present disclosure, a pan/tilt assembly for an antenna apparatus having a housing enclosing antenna components and a leg extending from the housing includes a first actuator for rotating a first gear, a second actuator for rotating a second gear, a third gear coupled to the leg and engaged by the first and second gears, and a tee having a first portion substantially transverse to a second portion, wherein the first portion has a first end rotatably received within the first gear and a second end rotatably received within the second gear, and wherein the second portion is rotatably received within the third gear.

In another aspect, an antenna apparatus includes a housing enclosing antenna components, a leg extending from the housing, and a pan/tilt assembly configured to tilt and pan the housing relative to the leg. The pan/tilt assembly may include a first actuator for rotating a first gear, a second actuator for rotating a second gear, a third gear coupled to the leg and engaged by the first and second gears, and a tee having a first portion substantially transverse to a second portion, wherein the first portion has a first end rotatably received within the first gear and a second end rotatably received within the second gear, and wherein the second portion is rotatably received within the third gear.

In another aspect, a method of tilting and panning a housing of an antenna apparatus relative to a leg extending from the housing, wherein the housing enclosing antenna components includes providing a pan/tilt assembly. The pan/tilt assembly may include a first gear aligned axially with a second gear, and a third gear coaxially aligned with the leg and engageable by the first and second gears. The method may further include rotating the first gear in a first direction and rotating the second gear in a second direction to pan the housing and rotating the first gear in a first direction and rotating the second gear in the first direction to tilt the housing.

DESCRIPTION OF THE DRAWINGS

The foregoing aspects and many of the attendant advantages of this disclosure will become more readily appreciated by reference to the following detailed description, when taken in conjunction with the accompanying drawings, wherein.

DETAILED DESCRIPTION

Embodiments of the present disclosure are directed to antenna apparatuses designed for sending and/or receiving radio frequency signals to and/or from a satellite or a constellation of satellites. The antenna systems of the present disclosure may be employed in communication systems providing high-bandwidth, low-latency network communication via a constellation of satellites. Such constellation of satellites may be in a non-geosynchronous Earth orbit (GEO), such as a low Earth orbit (LEO).

Figure 1:
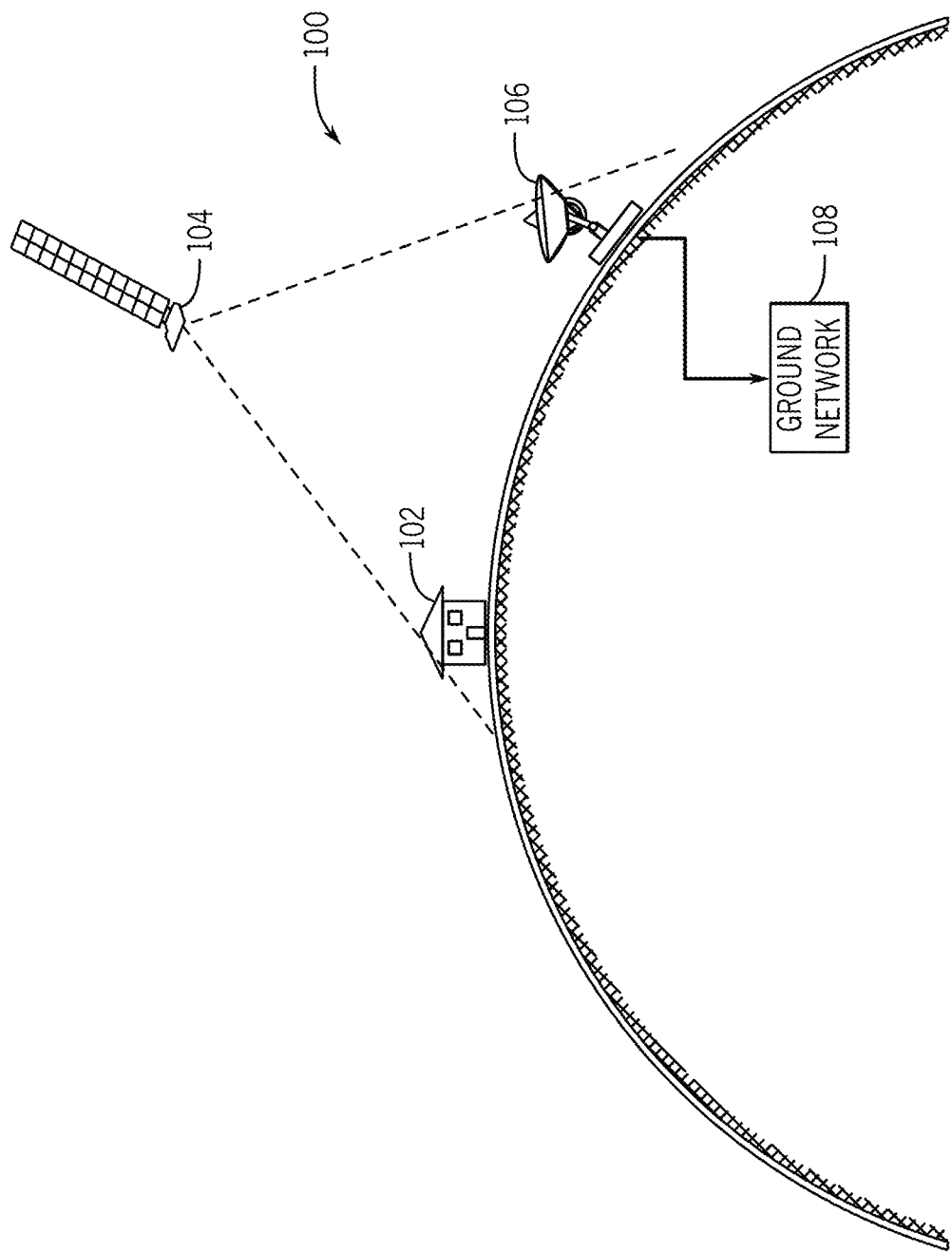
FIG. 1 is a not-to-scale diagram illustrating a simple example of communication in a satellite communication system.

FIG. 1 illustrates a not-to-scale embodiment of an antenna and satellite communication system 100 in which embodiments of the present disclosure may be implemented. As shown in FIG. 1, an Earth-based endpoint or user terminal 102 is installed at a location directly or indirectly on the Earth's surface such as house or other a building, tower, a vehicle, or another location where it is desired to obtain communication access via a network of satellites. An Earth-based endpoint terminal 102 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon.

A communication path may be established between the endpoint terminal 102 and a satellite 104. In the illustrated embodiment, the first satellite 104, in turn, establishes a communication path with a gateway terminal 106. In another embodiment, the satellite 104 may establish a communication path with another satellite prior to communication with a gateway terminal 106. The gateway terminal 106 may be physically connected via fiber optic, Ethernet, or another physical connection to a ground network 108. The ground network 108 may be any type of network, including the Internet. While one satellite 104 is illustrated, communication may be with and between a constellation of satellites.

Figure 2:
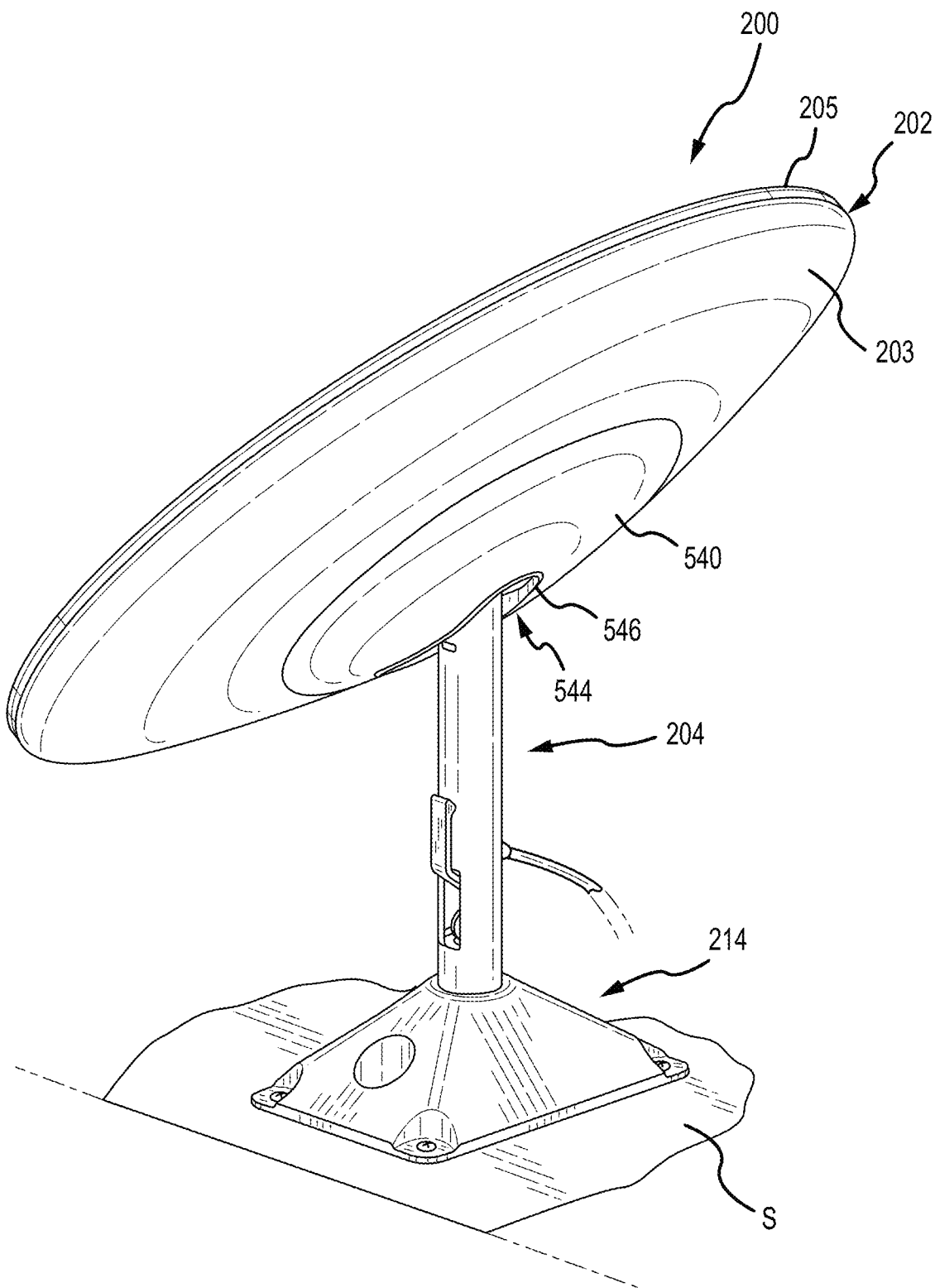
FIG. 2 is an isometric view of an antenna apparatus in accordance with a first exemplary embodiment of the present disclosure, wherein the antenna apparatus includes an antenna housing moveably secured to a leg, and wherein the antenna apparatus is shown in a second tilt configuration.
Figure 3:
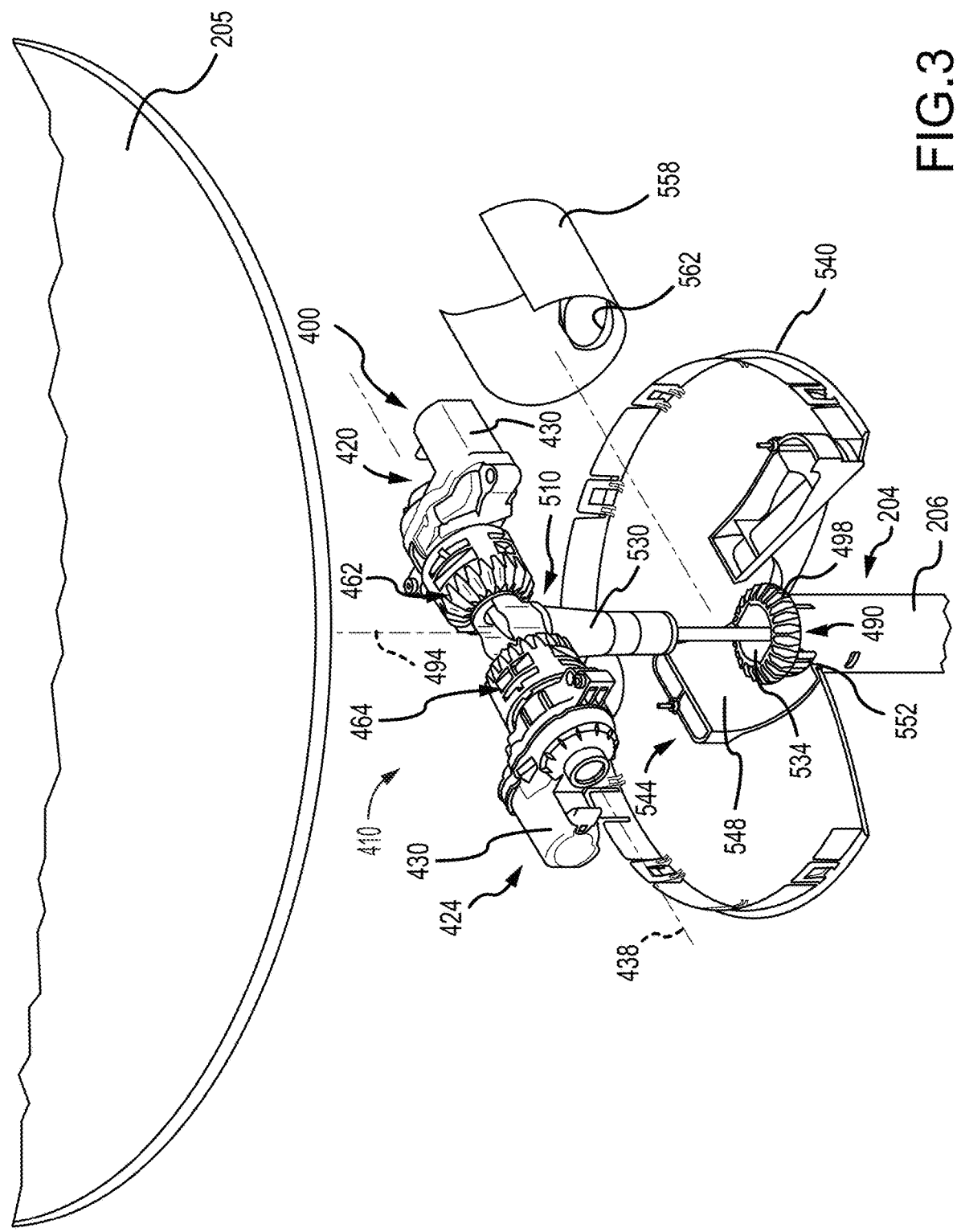
FIG. 3 is a first isometric, partially exploded view of an exemplary embodiment of a pan/tilt assembly of the antenna apparatus configured to move the antenna housing relative to the leg, wherein the pan/tilt assembly is shown in a first tilt configuration.
Figure 4:
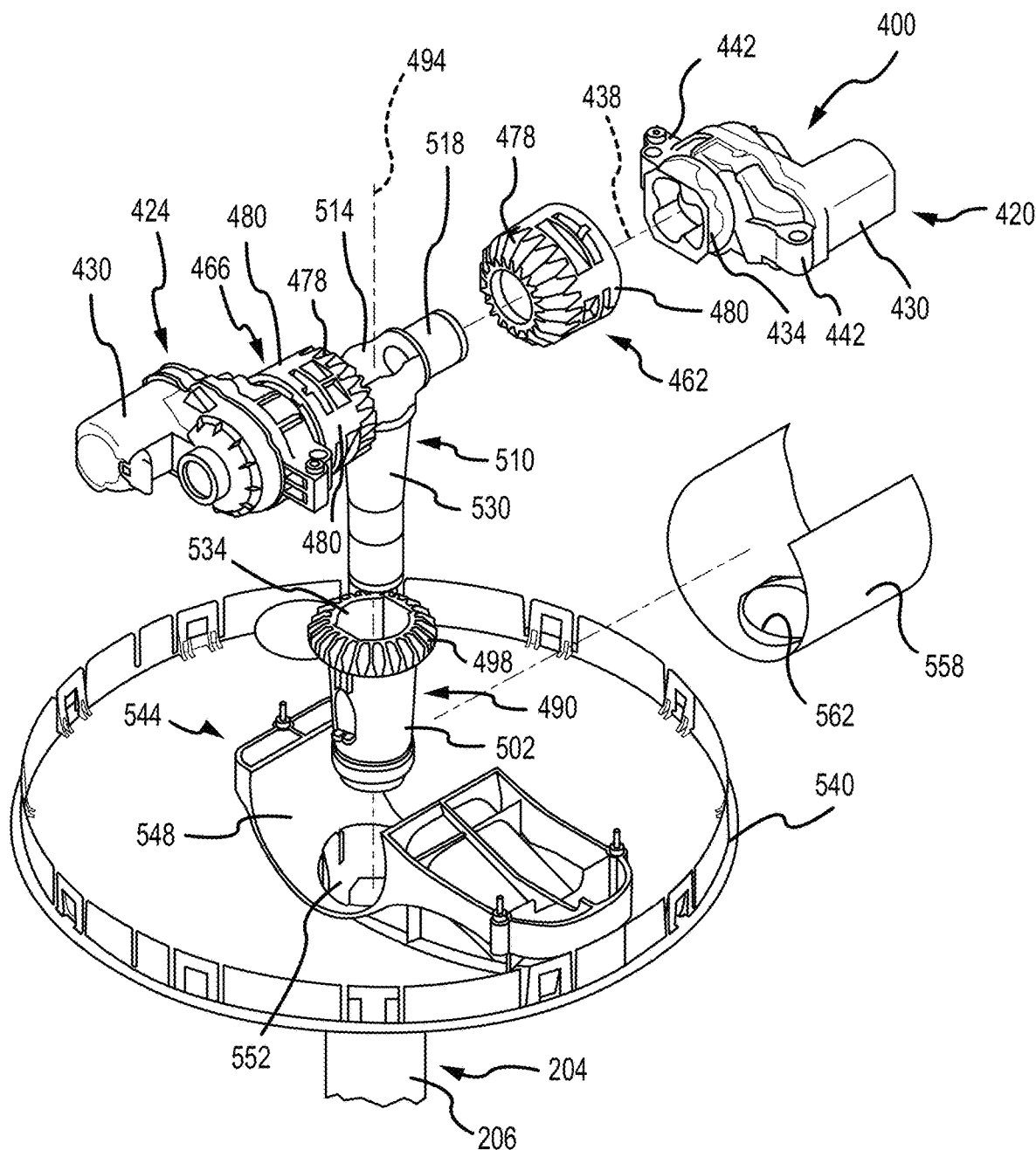
FIG. 4 is a second isometric, partially exploded view of the pan/tilt assembly of FIG. 3.

The endpoint or user terminal 102 may include an antenna apparatus 200, for example, as illustrated in FIG. 2. As shown, the antenna apparatus 200 may include an antenna housing 202, within which a phased array antenna system (not shown) and other electronic components are disposed. In various embodiments, the antenna system is designed for sending and/or receiving radio frequency signals to and/or from a satellite or a constellation of satellites.

In the depicted exemplary embodiment, the antenna housing 202 is defined by a radome portion 205 having a top planar surface that encloses an upper open end of a substantially dome-shaped lower enclosure 203. In accordance with embodiments of the present disclosure, the antenna apparatus 200 and its antenna housing 202 may include materials for durability and reliability in an outdoor environment as well as facilitating the sending and/or receiving radio frequency signals to and/or from a satellite or a constellation of satellites with the satellites 104.

In the illustrated embodiment, the antenna apparatus 200 includes a single leg 204 extending from the antenna housing 202. The leg 204 may be defined by a generally hollow cylindrical or tubular body 206, although other configurations may be used. With a hollow configuration, any necessary wiring or electrical connections may extend into and within the interior of the body 206 of the leg 204 up into the antenna housing 202 of the antenna apparatus 200.

The leg 204 may extend from the antenna housing 202, and specifically, the lower enclosure 203 at substantially a center point of the antenna housing 202. The center mount location allows for symmetry and balance when the antenna apparatus 200 is mounted to a surface. However, in other embodiments, the leg 204 may be attached to the antenna housing 202 at an offset location depending on the configuration and weighting of the antenna apparatus 200. Moreover, in other embodiments, more than one leg may extend from the antenna housing 202.

The antenna apparatus 200 is configured to be mounted on a mounting surface S for an unimpeded view of the sky. As not limiting examples, the antenna apparatus 200 may be mounted at an Earth-based fixed position, for example, the roof or wall of a building, a tower, a natural structure, a ground surface, an atmospheric platform or balloon, or on a moving vehicle, such as a land vehicle, airplane, or boat, or to any other appropriate mounting surface having an unimpeded view of with the sky for satellite communication. After the antenna apparatus 200 is mounted on an external surface of a building, the cabling can be connected to an outlet external to the building or it may pass through an opening in the building to be connected to an internal outlet.

As can be seen in FIG. 2, the antenna apparatus 200 is configured to allow for tilt-ability of the antenna housing 202 relative to the leg 204. Such tilt-ability of the antenna housing 202 allows for not only rain and snow removal and heat dissipation, but also for orientation of the antenna apparatus 200 with the sky for enhanced radio frequency communication with one or more satellites depending on the geolocation of the antenna apparatus 200 and the orbit of the satellite constellation. In that regard, the antenna apparatus 200 is also configured to allow for rotation of the antenna housing 202 (i.e., pan) about the longitudinal axis of the leg 204 to optimize internal antenna components for communication.

Referring to FIGS. 3-8, an exemplary embodiment of an antenna pan/tilt assembly 400 configured to allow for pan and tilt of the antenna housing 202 relative to the leg 204 will now be described. In general, the antenna pan/tilt assembly 400 includes a motion control assembly 410 secured to an interior portion of the antenna housing 202, and a torque transfer assembly or gear assembly 414 operably coupled to the motion control assembly 410 for transferring torque from the motion control assembly 410 to the antenna housing 202. The motion control assembly 410 may be activated to pan or tilt the antenna housing 202 relative to the leg 204.

In the depicted exemplary embodiment, the motion control assembly 410 includes first and second diametrically opposed actuators 420 and 424 disposed within the antenna housing 202. The first and second actuators 420 and 424 are identical, and therefore, only the first actuator 420 will be described in detail with identical parts of the second actuator 424 labeled with identical reference numerals.

The first actuator 420 may be any suitable configuration, such as an electric motor 430 that rotates an output portion 434 about a first rotation axis 438. In one embodiment, the electric motor 430 includes an integrated and/or wireless controller and an absolute encoder for controlling angular position and speed. For instance, the electric motor 430 may be activated by the controller and then moved through predetermined, controlled angular positions. In a specific embodiment, the first actuator 420 is a powerfold actuator available from Magna International Inc. of Ontario, Canada.

The electric motor 430 of the first actuator 420 is secured to the interior of the antenna housing 202 of the antenna apparatus 200 through a suitable motor mounting assembly 440. In general, the motor mounting assembly 440 is configured to secure the electric motor 430 to the interior of the antenna housing 202 such that the antenna housing 202 may move with the electric motor 430 when it is activated.

In the depicted exemplary embodiment, the motor mounting assembly 440 includes at least one first mounting portion 442 defined on the electric motor 430, such as on an exterior of a housing of the motor (not separately labeled). The at least one first mounting portion 442 is configured to be aligned with and secured to a corresponding second mounting portion 446 transversely secured within an interior frame or chassis 450 of the antenna apparatus 200. The interior chassis 450, which may define an internal structure of the antenna apparatus 200 for supporting one or more internal components, may be coupled, for instance, to the lower enclosure 203 and/or the radome portion 205. In that regard, a rigid connection is defined between the second mounting portion 446 and the antenna housing 202 through the interior chassis 450.

A suitable fastening device, such as a bolt 454 passes through both of the first and second mounting portions 442 and 446 for rigidly securing the electric motor 430 to the interior chassis 450. In that regard, any movement of the motor 430 correspondingly moves the antenna housing 202. As noted above, the second actuator 424 is identical to the first actuator 420; and therefore, the electric motor 430 of the second actuator 424 may be secured to the interior of the antenna housing 202 in a substantially identical manner.

As also noted above, the first and second actuators 420 and 424 are mounted to the interior of the antenna housing 202 in a diametrically opposed arrangement. In this manner, the output portions 434 of the actuators 420 and 424 are coaxially aligned and configured to rotate (upon activation by the electric motor 430) about the first rotation axis 438. The electric motor 430 of each actuator 420 and 424 may be activated to move its respective output portion 434 and transfer torque to the gear assembly 414.

In the depicted exemplary embodiment, the output portion 434 of each of the first and second actuators 420 and 424 is coaxially secured to first and second gears 462 and 466, respectively, of the gear assembly 414. The output portion 434 of each of the first and second actuators 420 and 424 is coaxially secured to first and second gears 462 and 466 such that the gears rotate with the output portion 434 about the first rotation axis 438. The output portion 434 of each of the first and second actuators 420 and 424 is coaxially secured to first and second gears 462 and 466 in any suitable manner, such as a snap fit, a bayonet fit, a press fit, etc. (not shown or described in detail).

In one embodiment, the first and second gears 462 and 466 are bevel gears each having a first beveled tooth portion 478 defined at a distal end of a first gear shaft body 480. The first and second bevel gears 462 and 466 mesh with a third bevel gear 490 of the gear assembly 414 that has a second rotation axis 494 substantially transverse to the first rotation axis 438. More specifically, the first beveled tooth portion 478 of the first and second bevel gears 462 and 466 mesh with a second beveled tooth portion 498 of the third bevel gear 490. In that regard, the first beveled tooth portion 478 of each of the first and second bevel gears 462 and 466 may move along the path of the second beveled tooth portion 498 of the third bevel gear 490 as the first and second bevel gears 462 and 466 rotate.

The third bevel gear 490 includes a second gear shaft body 502 extending from the second beveled tooth portion 498 that is receivable within the top open end of the body 206 of the leg 204. The second gear shaft body 502 is secured within the top open end of the body 206 of the leg 204 such that the second beveled tooth portion 498 protrudes from the top of the leg 204 and is engageable by the first and second bevel gears 462 and 466. Moreover, the second gear shaft body 502 is secured within the top open end of the body 206 of the leg 204 such that the third bevel gear 490 does not rotate relative to the leg 204 about the second rotation axis 494. Rather, the third bevel gear 490 is fixed in rotation relative to the leg 204, such as through a suitable snap-fit assembly 506 (see FIG. 7).

Figure 5:
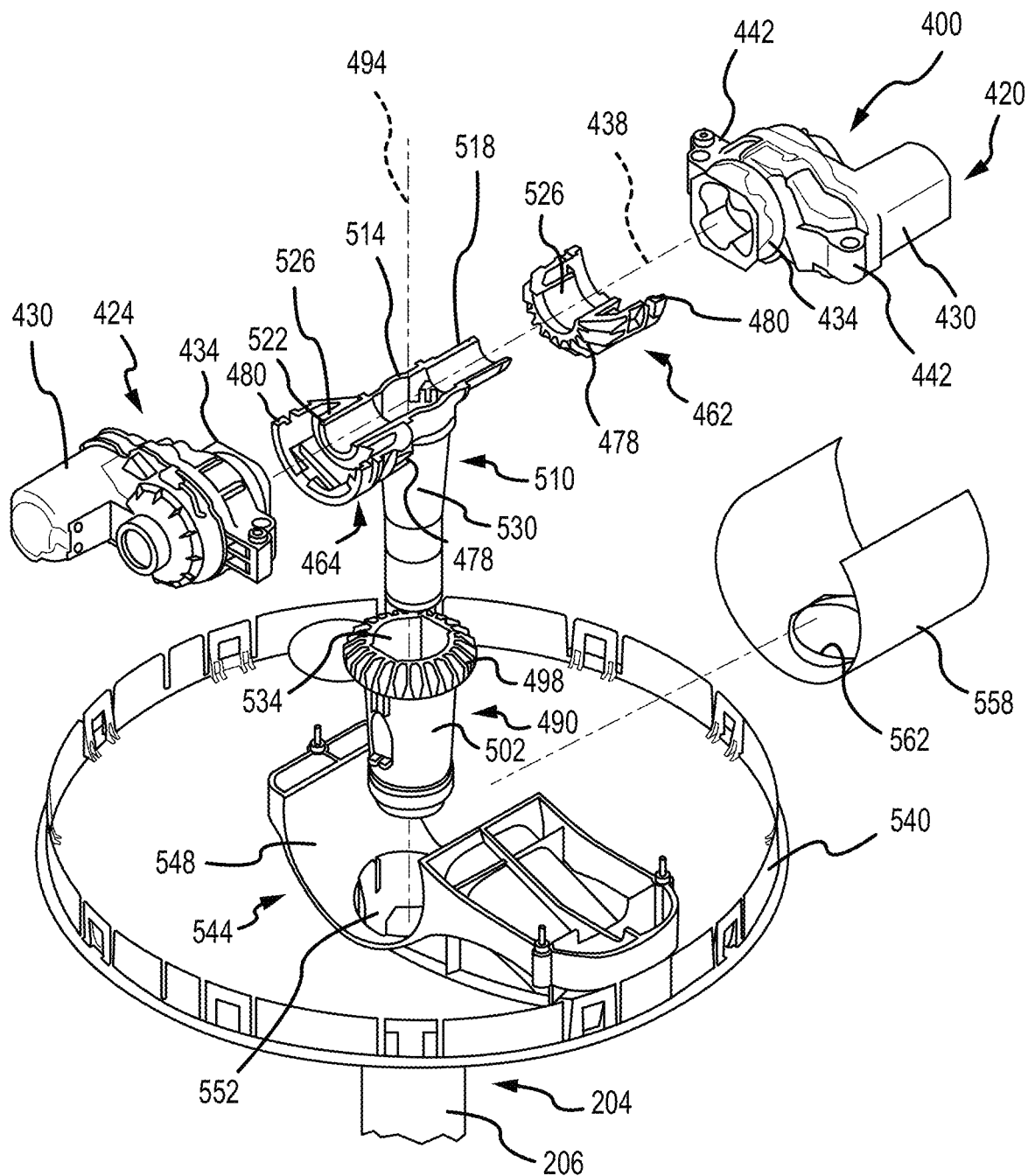
FIG. 5 is a third isometric, partially exploded cross-sectional view of the pan/tilt assembly of FIG. 3.
Figure 6:
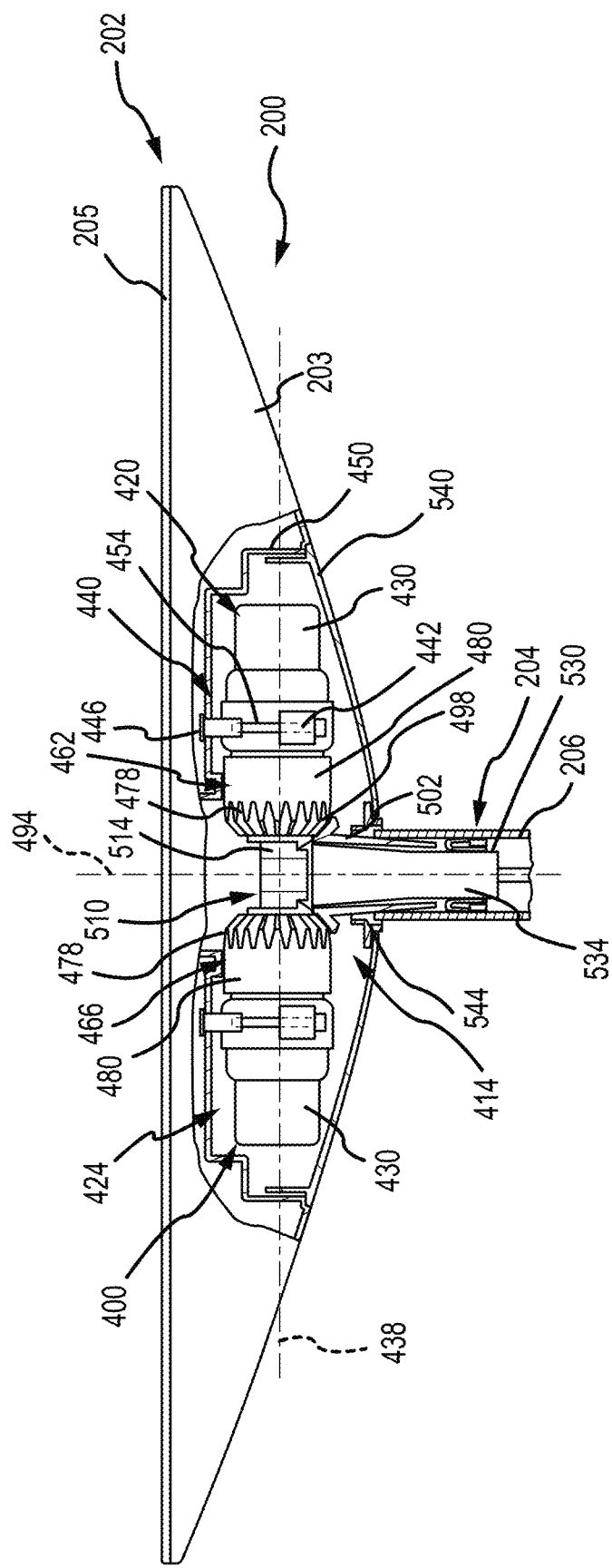
FIG. 6 is a cross-sectional, non-exploded view of the antenna apparatus of FIG. 3 showing the pan/tilt assembly interfaced with the leg and the antenna housing, wherein components of the pan/tilt assembly have been simplified for ease of illustration.

The output torque of the first and second actuators 420 and 424 is transferred to the gear assembly 414 and thereafter to the antenna housing 202 through a tee 510 that is rotatably mated with the first, second, and third bevel gears 462, 466, and 490. As can be seen in FIG. 5, the tee 510 includes a horizontal portion 514 having first and second opposite ends 518 and 522, and a vertical portion 530 extending transversely down from the horizontal portion 514. The first and second ends 518 and 522 of the horizontal portion 514 are rotatably receivable within an axial bore 526 of the corresponding first and second bevel gears 462 and 466. The first and second ends 518 and 522 of the horizontal portion 514 may be rotatably secured within the corresponding axial bore 526 in any suitable manner, such as by a snap-fit connection or the like.

The vertical portion 530 of the tee 510 is configured to be rotatably received within an axial bore 534 of the third bevel gear 490. The axial bore 534 extends from the second beveled tooth portion 498 down through the second gear shaft body 502 a sufficient distance to rotatably receive the vertical portion 530 of the tee 510. The vertical portion 530 of the tee 510 may be rotatably secured within the axial bore 534 of the third bevel gear 490 in any suitable manner, such as by a snap-fit connection or the like.

The horizontal and vertical portions 514 and 530 of the tee 510 are rotatably mated with the first, second, and third bevel gears 462, 466, and 490 such that the first and second bevel gears 464 and 466 mesh with the third bevel gear 490. In this manner, when the first and second bevel gears 462 and 466 are rotated by the first and second actuators 420 and 424, respectively, the first and second bevel gears 462 and 466 rotate relative to the horizontal portion 514 and can move along the path of the third bevel gear 490. Moreover, with the electric motor 430 of each actuator 420 and 424 fixedly coupled to the interior of the antenna housing 202, rotation of the first and second bevel gears 462 and 466 causes the antenna housing 202 to move relative to the leg 204.

Depending on the direction in which the first and second bevel gears 462 and 466 are rotated, the antenna housing 202 pans or tilts relative to the leg 204. In one aspect, the tilt assembly 400 is activated to pan the antenna housing 202 relative to the leg 204; i.e., to rotate the antenna housing 202 about the second rotation axis 494.

Figure 7:
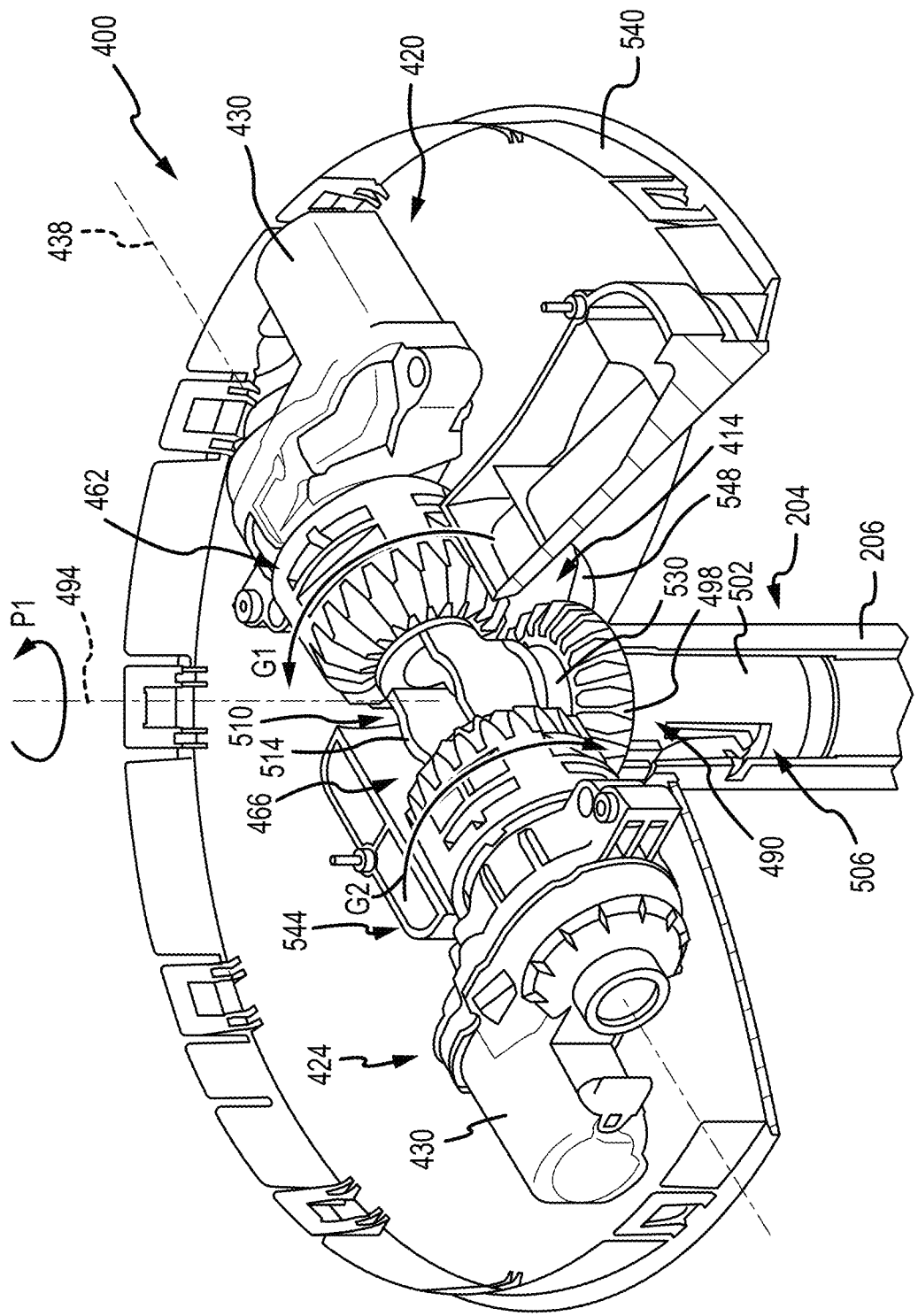
FIG. 7 is an isometric, partially cut away view of the antenna apparatus of FIG. 3 showing the pan/tilt assembly interfaced with the leg and the antenna housing.

Referring to FIG. 7, the antenna housing 202 is shown being panned or rotated in a counterclockwise direction about the second rotation axis 494, as indicated by arrow P1. To pan the antenna housing 202 in a counterclockwise direction about the second rotation axis 494, the first actuator 420 is activated to rotate the first bevel gear 462 counterclockwise about the first rotation axis 438 (as indicated by arrow G1) while the second actuator 424 is activated to rotate the second bevel gear 466 clockwise about the first rotation axis 438 (as indicated by arrow G2). With the first and second bevel gears 462 and 466 rotating in opposite directions about the first rotation axis 438, the first and second bevel gears 462 and 466 both move along the path of the third bevel gear 490 in the counterclockwise direction. As a result, the motors 430 of the first and second actuators 420 and 424, and therefore the antenna housing 202, correspondingly move within the first and second bevel gears 462 and 466 in a counterclockwise direction about the second rotation axis 494 (as indicated by arrow P1).

To pan the antenna housing 202 in an opposite, clockwise direction about the second rotation axis 494, the first actuator 420 is activated to rotate the first bevel gear 462 clockwise about the first rotation axis 438 while the second actuator 424 is activated to rotate the second bevel gear 466 counterclockwise about the first rotation axis 438. As a result, the first and second bevel gears 462 and 466 both move along the third bevel gear 490 (and about the second rotation axis 494) in a clockwise direction. Movement of the second bevel gears 462 and 466 clockwise about the second rotation axis 494 correspondingly moves the motors 430 of the first and second actuators 420 and 424, and therefore the antenna housing 202, in a clockwise direction about the second rotation axis 494.

The pan/tilt assembly 400 may be activated to pan the antenna housing 202 in a clockwise or counterclockwise direction relative to the leg 204, for instance, during initial installment of the antenna apparatus 200. As a specific example, when the antenna apparatus 200 is mounted to a surface S at a user's geographic location, the antenna system enclosed within the antenna housing 202 may not be appropriately oriented for sending and/or receiving radio frequency signals to and/or from a satellite or a constellation of satellites. In that regard, after the leg 204 of the antenna apparatus 200 is mounted to a surface S, the antenna housing 202 may be panned about the leg 204 to appropriately position the antenna components of the antenna apparatus 200 according to the user's geographic location. In one embodiment, the antenna housing 202 is panned only once during initial installation and setup, and the antenna housing 202 is thereafter maintained in that panned position during use of the antenna apparatus 200. In that regard, installation of the antenna apparatus 200 for the user is simplified. In other embodiments, the antenna housing 202 is periodically panned during use of the antenna apparatus 200 for orienting the antenna components for communication with a satellite(s).

As noted above, the tilt assembly 400 may also be activated to tilt the antenna housing 202 relative to the leg 204; i.e., to rotate the antenna housing 202 about the first rotation axis 438. Such tilt-ability of the antenna housing 202 allows for not only rain and snow removal and heat dissipation, but also for orientation of the antenna apparatus 200 with the sky for enhanced radio frequency communication with one or more satellites depending on the geolocation of the antenna apparatus 200 and the orbit of the satellite constellation.

Figure 8:
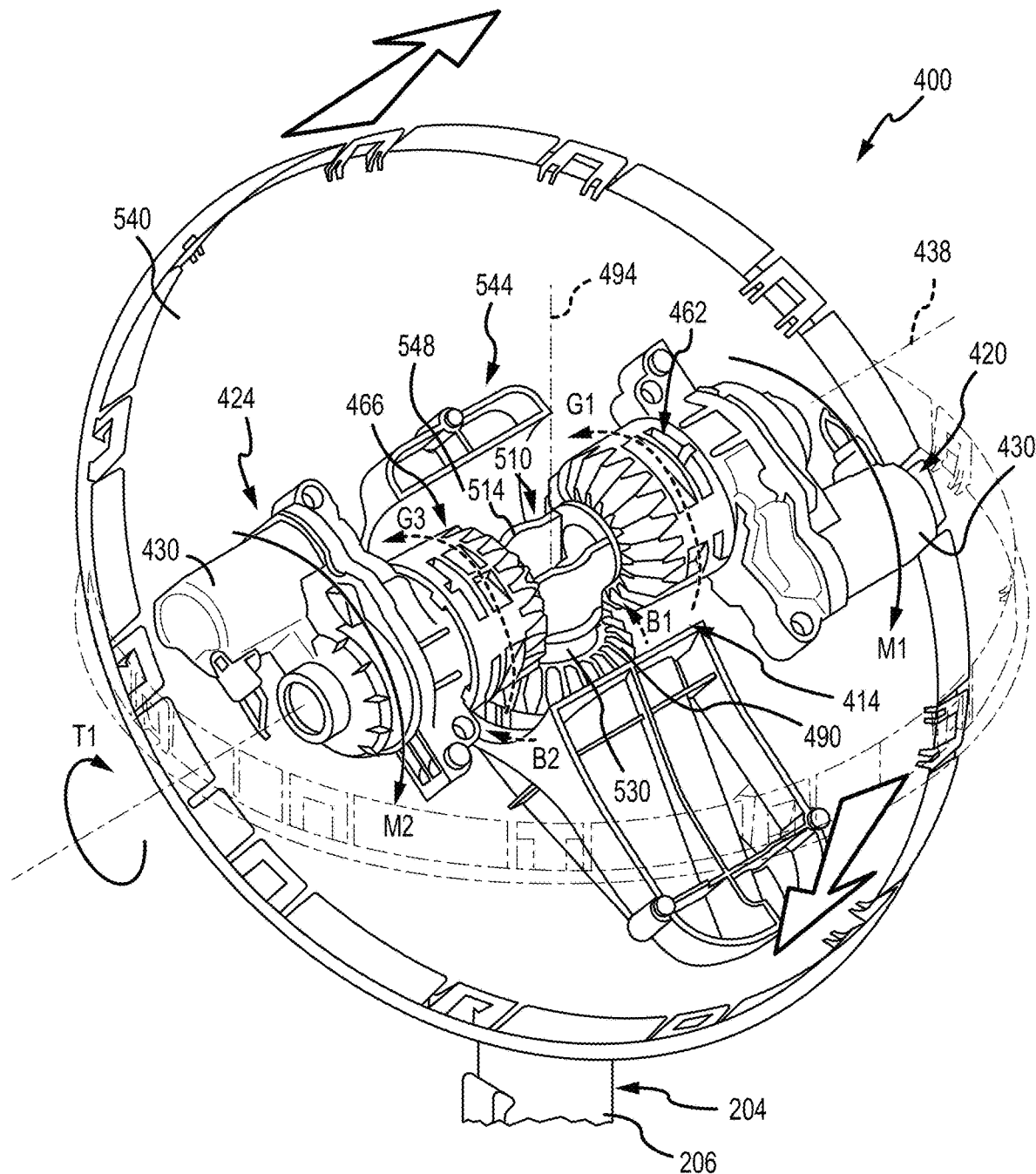
FIG. 8 is an isometric view of a portion of the antenna apparatus of FIG. 3, wherein the pan/tilt assembly is shown being moved into the second tilt configuration.

FIG. 8 shows the antenna housing 202 tilting about the first rotation axis 438 in a counterclockwise direction, as indicated by arrow T1. To tilt the antenna housing 202 counterclockwise about the first rotation axis 438, the first bevel gear 462 is rotated counterclockwise about the first rotation axis 438 (as indicated by dashed arrow G1) and the second bevel gear 466 is rotated counterclockwise about the first rotation axis 438 (as indicated by dashed arrow G3). When the first and second bevel gears 462 and 466 are rotated counterclockwise about the first rotation axis 438, the first and second bevel gears 462 and 466 try to correspondingly rotate relative to the third bevel gear 490 in opposite directions. More specifically, the first bevel gear 462 tries to move along the path of the third bevel gear 490 in a counterclockwise direction about the second rotation axis 494, as indicated by arrow B1, and the second bevel gear 466 tries to move along the path of the third bevel gear 490 in a clockwise direction about the second rotation axis 494, as indicated by arrow B2.

However, both of the first and second bevel gears 462 and 464 are fixedly coupled to the antenna housing 202 through the motors 430 of the first and second actuators 420 and 424; and therefore, the motors 430 try to correspondingly move the antenna housing 202 in the counterclockwise and clockwise directions. Because the antenna housing 202 cannot move in both rotational directions at the same time, the first and second bevel gears 462 and 466 do not move along the third bevel gear 490 in opposite directions. Rather, the first and second bevel gears 462 and 466 are locked out against the third bevel gear 490 i.e., they do not rotate relative to the third bevel gear 490. Instead, the actuators 420 and 424 transmit the torque to the electric motor 430 to pivot the motor about the first rotation axis 438 relative to the first and second bevel gears 462 and 466 (and relative to the output portions 434 coupled thereto). In other words, with the first and second bevel gears 462 and 466 locked out against the third bevel gear 490, the electric motor 430 of each of the first and second actuators 420 and 424 rotates relative to the gears 462/466 and output portions 434.

In that regard, when the first actuator 420 is activated to rotate the first bevel gear 462 counterclockwise about the first rotation axis 438 (as indicated by dashed arrow G1) and the second actuator 424 is activated to rotate the second bevel gear 466 counterclockwise about the first rotation axis 438 (as indicated by dashed arrow G3), the motors 430 of the first and second actuators 420 and 424 rotate clockwise about the first rotation axis 438 (as indicated by arrows M1 and M2). As a result, the antenna housing 202 correspondingly moves clockwise about the first rotation axis 438, as indicated by arrow T1, from a first tilt position (shown in dashed lines) into a second tilt position (shown in solid lines); i.e., the antenna housing 202 tilts in a first (counterclockwise) direction about the first rotation axis 438.

To tilt the antenna housing 202 in a second, opposite (counterclockwise) direction about the first rotation axis 438, the first actuator 420 is activated to rotate the first bevel gear 462 clockwise about the first rotation axis 438 while the second actuator 424 is activated to rotate the second bevel gear 466 clockwise about the first rotation axis 438. As a result, the motors 430 of the first and second actuators 420 and 424, and therefore the antenna housing 202, correspondingly rotate counterclockwise about the first rotation axis 438; i.e., the antenna housing 202 tilts in a second (clockwise) direction about the first rotation axis 438.

It can be appreciated that in the depicted exemplary embodiment, the antenna housing 202 may be panned about the second rotation axis 494 from a first rotational position into a second rotational position (e.g., twelve o'clock to three o'clock), and then tilted about the first rotation axis 438 from the second (e.g., three o'clock) rotational position. In other words, the antenna housing 202 may be tilted about the first rotation axis 438 after being panned about the second rotation axis 494. However, in some embodiments, the antenna housing 202 is not moved in the reverse order.

More specifically, in some embodiments, the antenna housing 202 is not panned after moving from a first tilting position into a second tilting position, where the second tilting position is at an angle relative to the leg 204. For instance, if the antenna housing 202 is tilted from a first tilting position, wherein the antenna housing 202 is substantially transverse to the leg 204 (see FIG. 7), to a second tilting position, wherein the antenna housing 202 is at an angle relative to the leg 204 (see FIG. 8), the antenna housing 202 is not panned while in the second tilting position.

Such a pan limitation may be desired for controlling operation of the antenna apparatus 200 after installation. For instance, as noted above, in some embodiments, the antenna housing 202 is panned only once during initial installation and setup, and the antenna housing 202 is thereafter maintained in that panned position during use of the antenna apparatus 200. Accordingly, in such an embodiment, the antenna housing 202 is tilted about a single, fixed, tilt axis.

Such a pan limitation may instead be the result of using a simple, compact pan/tilt design for a more compact antenna apparatus, such as the phased array antenna apparatus 200 shown. In that regard, it should be appreciated that instead of the gear arrangement depicted, any suitable bevel gears and operating angles and/or other gear arrangements may instead be used to accommodate orientation of a different antenna system and/or a different antenna housing relative to a mounting surface S.

The antenna apparatus 200 may also be configured to limit the tilting capabilities of the antenna housing 202 relative to the leg 204. As can be appreciated from FIGS. 2-8, the antenna housing 202 may be tilted between at least a first, zero degree (0°) tilt position, wherein the antenna housing 202 is substantially transverse to the leg 204 (and the second rotation axis 494), and a second tilt position, wherein the antenna housing 202 is at an angle relative to the leg 204 (and the second rotation axis 494). The second tilt position, as shown herein, may be about forty-five degrees (45°) rotated from the first tilt position. Although not shown in the exemplary embodiment depicted in FIGS. 2-8, the antenna housing 202 may also be tilted up to an angle of about ninety degrees (90°) from the first tilt position, or at any angle between zero degrees (0°) and ninety degrees (90°) from the first tilt position.

In one embodiment, the tilting angle of the antenna housing 202 may be restricted to a certain range, such as between about zero degrees (0°) and ninety degrees (90°), through mechanical hard stops or the like. For instance, the antenna housing 202 may include a tilt/pan section 540 defined in the lower enclosure 203 that is configured to accommodate tilt-ability of the antenna housing 202 relative to the leg 204 while enclosing the interior of the antenna housing 202. In the depicted exemplary embodiment, the tilt/pan section 540 substantially matches the overall shape and contour of the lower enclosure 203 and is secured within the lower enclosure 203 in any suitable manner, such as by a snap fit connection.

The tilt/pan section 540 also includes a slotted opening assembly 544 configured to accommodate the pan-ability and tilt-ability of the antenna housing 202 relative to the leg 204. As can be seen in FIG. 2, the slotted opening assembly 544 includes a slotted exterior opening 546 defined in the tilt/pan section 540 that accommodates tilting and panning of the antenna housing 202 relative to the leg 204. In that regard, the slotted exterior opening 546 has a sufficient width to allow the antenna housing 202 to rotate about the leg 204 (i.e., about the second rotation axis 494).

Moreover, the slotted opening assembly 544 has a sufficient length to allow the antenna housing 202 to move between a desired tilting range, such between about zero degrees (0°) and ninety degrees (90°), or any range in between. In that regard, the tilt/pan section 540 may define part of a hard stop assembly that limits the tilting range of the antenna housing 202. In other words, the leg 204 may engage the tilt/pan section 540 at the ends of the slotted exterior opening 546 when the antenna housing 202 reaches the end of its tilting range, such as ninety degrees (90°) from the first tilt position.

The slotted opening assembly 544 may also include a curved interior flexible slot covering 548 that extends between first and second ends of the slotted opening assembly 544 and that has a central receptacle 552 for receiving and sealing against the leg 204 and/or the third bevel gear 490. The slot covering 548 may comprise a waterproof or water-resistant material to help protect the interior components of the housing 202 from environmental effects and other debris, such as a plastic-coated fabric. At the same time, the covering 548 may be sufficiently flexible or deformable to accommodate the pan-ability and tilt-ability of the antenna housing 202 relative to the leg 204.

A curved, interior rigid slot covering 558 may be nested with the interior flexible slot covering 548 to further seal off the internal components of the antenna apparatus 200 from outdoor environmental effects and other debris. The interior rigid slot covering 558 may, for instance, move with the antenna housing 202 as it is tilted relative to the leg 204, whereas the interior flexible slot covering 548 may flex and/or deform to accommodate the tilting movement of the antenna housing 202. It should be appreciated that any other suitable sealing assemblies may instead be used.

Although not shown, the antenna apparatus 200 may include an integrated and/or remote control unit configured to activate and control the pan/tilt assembly 400. For instance, the control unit may include suitable circuitry for activating and controlling the speed, direction, position, etc., of the first and second actuators 420 and 424. In one exemplary aspect, the control unit may (in response to automatic or manually inputted on-board or remote instructions) output appropriate signals to activate and direct the first and second actuators 420 and 424. For instance, the control unit may activate the first and second actuators 420 and 424 to pan and/or tilt the antenna housing 202 to orient the antenna system for sending/receiving signals to a satellite depending on its orbital position.

In another exemplary aspect, the control unit may also be configured to limit the pan-ability and/or tilt-ability range of the antenna housing 202, in addition to or in lieu of a hard stop assembly. In that regard, the control unit may (in response to automatic or manually inputted on-board or remote instructions) output appropriate signals to deactivate or otherwise stop rotation of the output portion 434 of the first and second actuators 420 and 424 upon reaching a predetermined rotational position. In that regard, the control unit may also be configured to receive and process encoder data to pan and/or tilt the antenna housing 202 relative to the leg 204 into certain rotational positions and/or to hold the antenna housing 202 in one or more rotational positions.

The control unit may be any suitable electronic client device, such as a computer, personal digital assistant, cell phone, tablet computer, or any other suitable device in which computer software or other digital content may be executed. The electronic client device can be controlled either directly or by a remote connection using industry standard communication protocols such as HART, Modbus, 4-20 mA, and H1, as well as other protocols.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Language such as "top", "bottom", "upper", "lower", "vertical", "horizontal", "lateral", etc., in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

While illustrative embodiments have been illustrated and described, it will be appreciated that various changes can be made therein without departing from the spirit and scope of the disclosure.

The invention claimed is:

1. A method of tilting and panning a housing of an antenna apparatus relative to a leg extending from the housing, the housing enclosing antenna components, the method comprising:
   providing a pan/tilt assembly, comprising:
   a first gear aligned axially with a second gear;
   a third gear coaxially aligned with the leg and engageable by the first and second gears; and
   a tee having a first portion substantially transverse to a second portion, wherein the first portion has a first end rotatably received within the first gear and a second end rotatably received within the second gear, and wherein the second portion is rotatably received within the third gear; and
   rotating the first gear in a first direction and rotating the second gear in a second direction to pan the housing.

2. The method of claim 1, further comprising rotating the first and second gears in a first direction to tilt the housing.

3. The method of claim 1, wherein the pan/tilt assembly further comprises a first actuator coupled to the first gear and configured for rotating the first gear, and a second actuator coupled to the second gear and configured for rotating the second gear.

4. The method of claim 1, wherein the first and second gears are aligned along an axis that is substantially transverse to the longitudinal axis of the leg.

5. The method of claim 1, wherein the first, second, and third gears are disposed within the housing of the antenna apparatus.

6. A method of tilting and panning a housing of an antenna apparatus relative to a leg extending from the housing, the housing enclosing antenna components, the method comprising:
   providing a pan/tilt assembly, comprising:
   a first gear aligned axially with a second gear;
   a third gear coaxially aligned with the leg and engageable by the first and second gears;
   a first actuator coupled to the first gear and configured for rotating the first gear; and
   a second actuator coupled to the second gear and configured for rotating the second gear; and
   rotating the first gear in a first direction and rotating the second gear in a second direction to pan the housing.

7. The method of claim 6, further comprising rotating the first and second gears in a first direction to tilt the housing.

8. The method of claim 6, wherein the pan/tilt assembly further comprises a tee having a first portion substantially transverse to a second portion, wherein the first portion has a first end rotatably received within the first gear and a second end rotatably received within the second gear, and wherein the second portion is rotatably received within the third gear.

9. The method of claim 6, wherein the first and second gears are aligned along an axis that is substantially transverse to the longitudinal axis of the leg.

10. The method of claim 6, wherein the first, second, and third gears are disposed within the housing of the antenna apparatus.

* * * * *